United States Patent [19]

Kikuchi

[11] Patent Number: 4,773,537
[45] Date of Patent: Sep. 27, 1988

[54] HARD DISK CONTAINER

[75] Inventor: Shoji Kikuchi, Tokyo, Japan

[73] Assignee: Tensho Electric Industrial Co., Ltd., Shinagawa, Japan

[21] Appl. No.: 64,603

[22] Filed: Jun. 22, 1987

[51] Int. Cl.⁴ .............................................. B65D 85/57
[52] U.S. Cl. .................................. 206/444; 206/454
[58] Field of Search ............... 118/500; 206/307, 309, 206/449, 444, 445, 454, 455, 456, 328, 334, 564; 211/40, 41; 312/10

[56] References Cited

U.S. PATENT DOCUMENTS

| | | | |
|---|---|---|---|
| D. 260,237 | 8/1981 | Fuzere | 206/454 |
| 3,236,002 | 2/1966 | Cunningham et al. | 220/4 B |
| 4,091,919 | 5/1978 | Macleod et al. | 206/454 |
| 4,450,960 | 5/1984 | Johnson | 206/508 |
| 4,555,024 | 11/1985 | Voss et al. | 206/454 |
| 4,557,382 | 12/1985 | Johnson | 206/454 |
| 4,588,086 | 5/1986 | Coe | 206/454 |
| 4,669,612 | 6/1987 | Mortensen | 211/41 |

FOREIGN PATENT DOCUMENTS

| | | | |
|---|---|---|---|
| 0208062 | 1/1987 | European Pat. Off. | 206/309 |
| 2830387 | 2/1979 | Fed. Rep. of Germany | 211/40 |

Primary Examiner—Jimmy G. Foster
Attorney, Agent, or Firm—Wenderoth, Lind & Ponack

[57] ABSTRACT

A hard disk container has a container body in the form of a box having an opening at its upper portion and an upper cover in the form of a box having an opening at its lower portion and closing the container body. A protrusion on the upper edge of the container body engages a recess in the lower edge of the upper cover and includes a latching member to engage a latching hole in a flange of the container body.

6 Claims, 3 Drawing Sheets

HARD DISK CONTAINER

BACKGROUND OF THE INVENTION

This invention pertains to a hard disk container for transporting and/or preserving hard disks as magnetic recording medium which are used as a memory for a computer, for example, and which comprise an aluminum non-magnetic plate in the form of doughnut on which a magnetic layer is coated. The hard disk container may be used for a processing carrier in the course of producing the computer.

As shown in FIGS. 4 and 5, a prior art hard disk container 101 which has been generally used comprises a container body 102 having parallel grooves 103 for holding hard disks, respectively, and a notch for inserting a tool, an upper cover 105 having an engaging protrusion 106 provided thereon and a lower cover 107 having an engaging recess 108 complementary for the engaging protrusion 106 of the upper cover 105 when the containers are superposed on one another.

In general, the hard disks are produced by preparing the ground work of the aluminium non-magnetic plate in the form of doughnut, mirror-polishing it, forming a magnetic layer on it, forming a protective layer on it, examining it et cetera while the hard disks are removed from and container in the body of the hard disk container.

Although the hard disk container of the prior art as shown in FIGS. 4 and 5 has the notch 104 in the container body 102 which makes it easier to remove the hard disks from the container body 102, it is still difficult to frequently remove the hard disks from the container body 102 and contain them in it because they are enclosed by the container body 101 except for the notch 104.

SUMMARY OF THE INVENTION

Accordingly, it is a principal object of the invention to provide a hard disk container from which it is easier to remove hard disks and contain them in the hard disk container.

It is another object of the invention to provide a hard disk container adapted to tightly close an upper cover onto a container body even though the hard disks are easily removed from and contained in the hard disk container.

In accordance with the present invention, there is provided a hard disk container comprising:

a container body in the form of a box having an opening at its upper portion and including a first engaging portion provided on the upper edge of said container body and a plurality of containing parallel grooves in the inner surface thereof to hold said hard disks;

an upper cover in the form of a box having an opening at its lower portion and including a second engaging portion complementary to said first engaging portion and provided in the lower edge of said upper cover to engage said first engaging portion so as to tightly close said container body and a plurality of pairs of vertical grooves formed along the inner surface of said upper cover to hold the disk in the containing parallel grooves;

and latching means including a pair of latching members extending from said upper cover on both sides thereof and latching holes provided in a flange of said container body, through which said latching members extend to latch said upper cover onto said container body.

BRIEF DESCRIPTION OF THE DRAWINGS

The above and other objects and features of the invention will be apparent from the description of the embodiment taken with to the accompanying drawings in which.

DETAILED DESCRIPTION OF THE EMBODIMENTS

Figure 1:
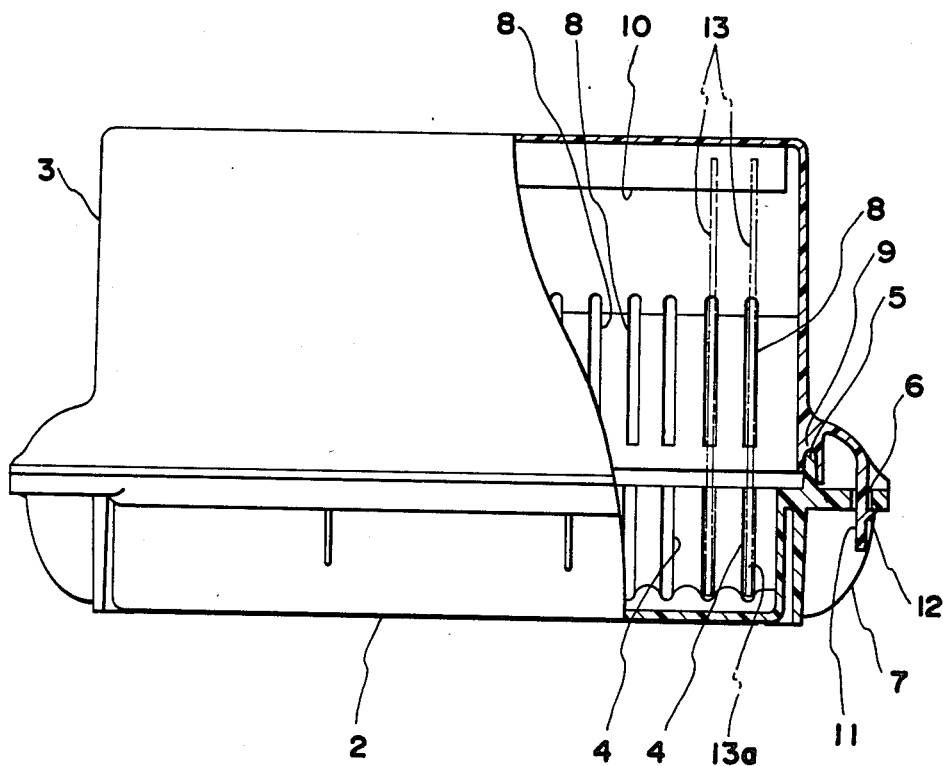
FIG. 1 is a front view of a hard disk container constructed in accordance with an embodiment of the invention with a portion broken away.
Figure 2:
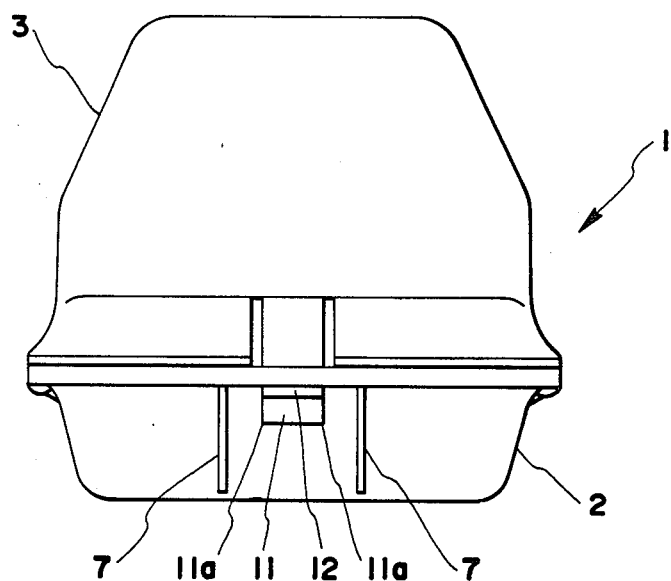
FIG. 2 is an end elevational view of the hard disk container of FIG. 1.
Figure 3:
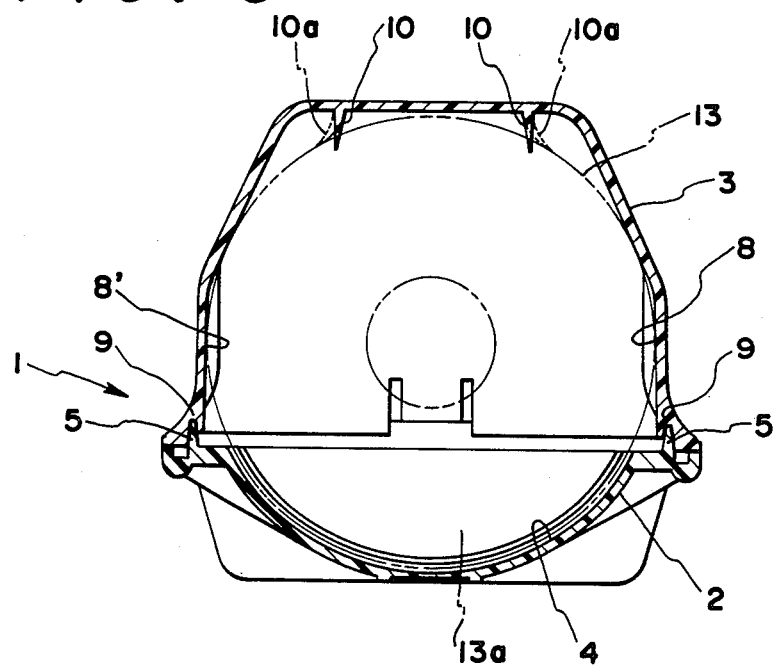
FIG. 3 is a cross sectional view of the hard disk container of FIG. 1.
Figure 4:
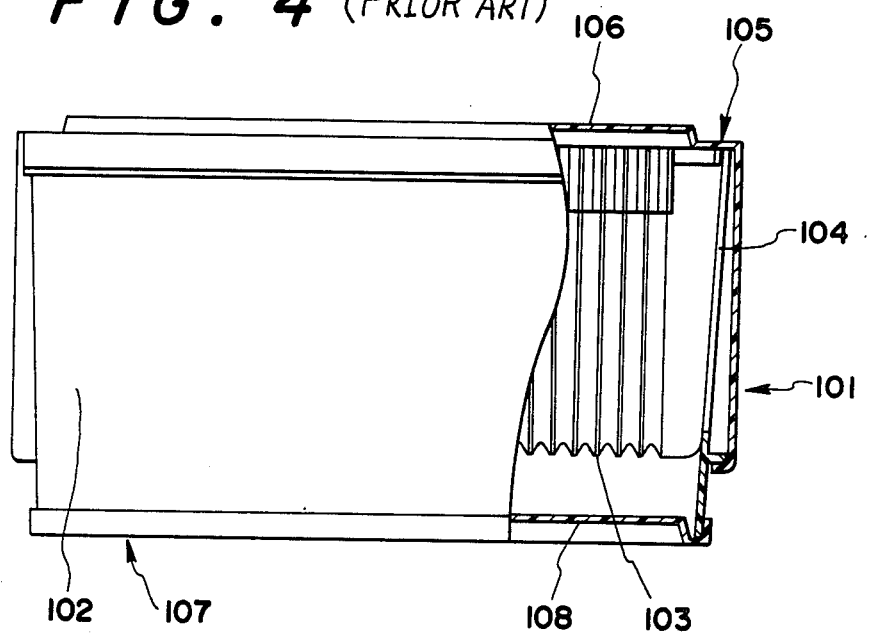
FIG. 4 is a front view view of a hard disk container of prior art with a portion broken away for its.
Figure 5:
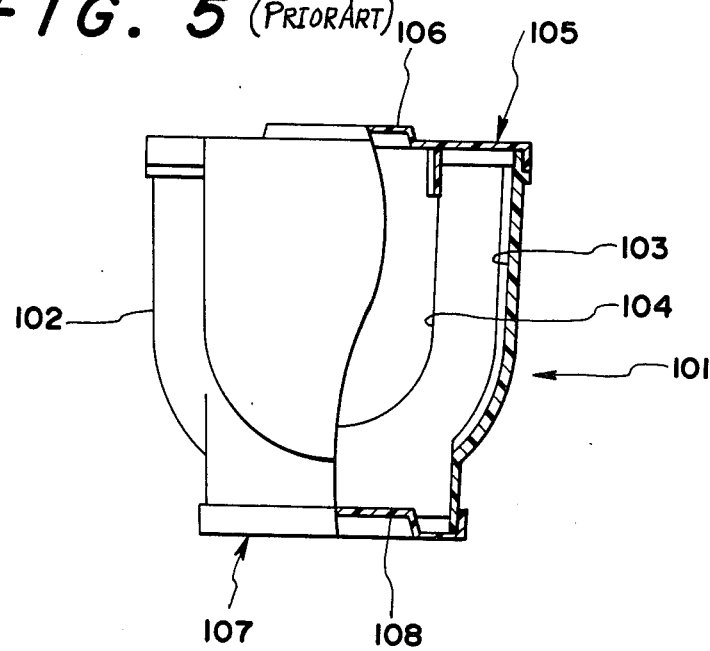
FIG. 5 is a side elevational view of the hard disk container of FIG. 4 with a portion broken away.

Referring now to FIGS. 1 through 3, there is shown a hard disk container 1 constructed in accordance with an embodiment of the invention. The container 1 comprises a container body 2 and an upper cover 3. The upper cover 3 is removably mounted on the container body 2 as described later.

As shown in FIGS. 1 and 3, the container body 2 is in the form of a box having an opening provided at its upper portion. The container body 2 has a plurality of containing parallel grooves 4 to engage hard disks 13 to hold them and a first engaging portion in the form of an engaging protrusion 5 provided at the periphery of its upper edge.

Also, as shown in FIGS. 1 and 3, the upper cover 3 is also in the form of a box having an opening provided at its lower portion. The upper cover 3 has a plurality of pair of vertical grooves 8 and 8' in opposed positions on opposite sides of said upper cover 3 and in alignment with the containing parallel grooves 4 in the container body 2 to hold hard disks 13 together with the containing parallel grooves 4 in a substantially vertical manner, and a second engaging portion in the form of an engaging recess 9 provided at the periphery of its lower edge and complementary to the engaging protrusion 5 of the container body 2. Thus, it will be noted that the upper cover 3 can be rigidly mounted on the container body 2 so as to tightly close it by engaging the engaging protrusion 5 with the engaging recess 9 in the upper cover 3. As noted from FIG. 3, the vertical grooves 8 and 8' may be spaced at such a distance that the grooves 8 and 8' at their lower portions have a depth larger than the outer diameter of the hard disks 13 and at their upper portions have a depth substantially equal to the outer diameter of the hard disks 13. Thus, it will be noted that the upper cover 3 can be mounted on the container body 2 without damaging the hard disks 13 because the hard disks 13 never engage the lower and inner edge of the upper cover 3. The upper cover 3 may include a plurality of pair of disk supporting pieces 10 depending from the top wall to prevent the hard disks 13 from being moved in the containing parallel grooves 4 in the container body 2 and the vertical grooves 8 and 8' in the upper cover 3. The disk supporting pieces 10 are preferably formed of soft and resilient material so that the disk supporting pieces 10 can extend outwardly as indicated by a numeral 10a in FIG. 3 when the upper cover 3 is engaged with the container body 2 to positively hold the hard disks 13 in a resilient manner.

There is provided latching means including a pair of latching member 11 in the form of tongues extending from the upper cover 3 on both ends thereof and latching holes 6 provided in a flange of the container body 2 at its upper edge, through which latching holes the latching members 11 extend to latch the upper cover 3 onto the container body 2. As shown in FIG. 1, the latching members 11 include a projection 12 which is to engage the lower face of the flange of the container body 2. Thus, it will be unintentionally noted that the upper cover 3 cannot be disconnected from the container body because the projections 12 of the latching members 11 engage the lower face of the flange of the container body 2. When the upper cover 3 is to be disconnected from the container body 2, the latching members 11 are flexed inwardly so that the projections 12 of the latching members 11 disengage the flange of the container body 2.

In the illustrated embodiment, there are provided a pair of spaced arcuate vertical ribs 7 on each end of the container body 2 extending from its bottom to the flange of the container body 2 on opposite sides of the latching holes 6 therein. The arcuate vertical ribs 7 serve to reinforce the flange of the container body 2 and also to protect a substantially thin vacuum enclosure film on the hard disk container 1 from being damaged by the lower edges 11a of the latching members 11 extending downwardly of the flange of the container body 2. If there are no vertical ribs on the container body 2, then the vacuum enclosure film will engage the lower edges 11a of the latching members 11, which causes the edges 11a of the latching members 11 to penetrate into and damage the vacuum enclosure film. The vacuum enclosure film may be used for closing the hard disk container 1 in an air tight manner so that dust and humidity never enter the container body 1. The vacuum enclosure film may be a double-walled enclosure in which humidity absorber may be contained.

Since the major portion of the hard disks 13 in the container 1 are exposed when the upper cover 3 is removed from the container body 2 because the container body 2 is relatively shallow, the hard disks 13 can be more easily removed from and placed in the container body 2 while the hard disks 13 are produced or when they are assembled in a computer even though they are frequently removed and replaced.

Furthermore, the upper cover 3 can be rigidly mounted on the container body 2 by latching the former onto the latter by means of the latching members 11 extending through the latching holes 6 and engaging the flange of the container body 2. The latching members 11 also serve to position the upper cover 3 when it is to be mounted on the container body 2 because they are guided by the latching holes 6. This protects the hard disks 13 from being damaged by the upper cover 3 when it is to be mounted on the container body 2.

Finally, the hard disks 13 may be rigidly held in the hard disk container 1 so that they are never moved therein because they engage the containing parallel grooves 4 in the container body 2, the vertical grooves 8 and 8' in the upper cover 3 and the disk supporting pieces 10 on the upper cover 2. Also, the container body 2 and the upper cover 3 are tightly engaged with each other by means of the protrusion 5 engaging the recess 9, which prevents dust and/or humidity from entering the hard disk container 1.

While one embodiment of the invention has been described and illustrated with reference to the accompanying drawings, it should be noted that it is by way of example, and that various changes and modifications may be made without departing from the spirit and scope of the invention, which is intended to be defined only by the appended claims.

What is claimed is:

1. A hard disk container comprising:
   a container body in the form of a box having an opening at its upper portion and including a first engaging portion extending along the periphery of the upper edge of said container body around said opening and a plurality of disk containing parallel grooves in the inner surface thereof for holding hard disks therein;
   an upper cover in the form of a box having an opening at its lower portion and including a second engaging portion complementary to said first engaging portion and extending along the periphery of the lower edge of said upper cover and engagable with said first engaging portion for tightly closing said container body when said upper cover is placed on said container body, said cover having opposite ends and opposite side walls extending between said opposite ends, the inner surfaces of said side walls having a plurality of pairs of opposed vertical grooves therein, each pair being aligned with a corresponding disk containing groove; and
   latching means including a pair of latching members depending from the opposite ends of said upper cover and flanges on said container body having latching holes therethrough for guiding said latching members therethrough for guiding said upper cover onto said container body in a direction parallel to said vertical grooves.

2. A hard disk container as set forth in claim 1, wherein said first engaging portion is a protrusion and said second engaging portion is a recess for receiving said protrusion.

3. A hard disk container as set forth in claim 1, wherein each of said latching members has a projection thereon for engaging the surface of the corresponding flange which faces away from said upper cover.

4. A hard disk container as set forth in claim 1, further comprising arcuate vertical ribs on said container body on opposite sides of the portions of said latching members extending through said latching holes.

5. A hard disk container as set forth in claim 1, wherein said inner surfaces of said opposite side walls have groove defining projections thereon defining said vertical grooves, the distance between said groove defining projections at the lower portions thereof toward said opening of said upper cover being greater than the outer diameter of the hard disks, and the distance between said groove defining projections at the upper portions thereof away from said opening of said upper cover being less than the outer diameter of the hard disks.

6. A hard disk container as set forth in claim 1, wherein said upper cover has a top, and further comprises a plurality of pair of disk supporting pieces depending from the inner surface of said top for engaging the hard disks, and preventing them from being moved in said parallel grooves in said container body and said vertical grooves in said upper cover, said disk supporting pieces being soft and resilient material pieces for enabling them to spread outwardly along the periphery of the hard disks.

* * * * *